United States Patent [19]

Komiyama et al.

[11] Patent Number: 4,936,089
[45] Date of Patent: Jun. 26, 1990

[54] GAS TURBINE PLANT SYSTEM AND GAS PRESSURE STABILIZER THEREOF IN EMERGENCY

[75] Inventors: Shigeru Komiyama; Katsunori Yoshida, both of Chiba; Yoshiaki Tsukuda, Hyogo; Eiji Akita, Hyogo; Kenji Imamura, Hyogo, all of Japan

[73] Assignees: Kawasaki Steel Corporation, Kobe; Mitsubishi Jukogyo Kabushiki Kaisha, Tokyo, both of Japan

[21] Appl. No.: 283,270

[22] Filed: Dec. 9, 1988

[30] Foreign Application Priority Data

Dec. 18, 1987 [JP] Japan ............................. 62-191461[U]

[51] Int. Cl.5 ................................................ F02C 3/22
[52] U.S. Cl. ................................. 60/39.12; 60/39.465; 220/217; 220/228
[58] Field of Search .......................... 60/39.12, 39.465; 220/217, 228; 277/3, DIG. 1

[56] References Cited

U.S. PATENT DOCUMENTS

| | | | |
|---|---|---|---|
| 1,714,209 | 5/1929 | Bohnhardt | 220/217 |
| 1,747,308 | 2/1930 | Levy | 220/228 |
| 2,439,792 | 4/1948 | Boardman | 220/217 |
| 2,845,776 | 8/1958 | Traupel | 60/39.465 |
| 2,984,978 | 5/1961 | Griffith | 60/39.465 |
| 4,116,357 | 9/1978 | Stanley, Jr. | 220/228 |

FOREIGN PATENT DOCUMENTS

| | | | |
|---|---|---|---|
| 165526 | 9/1983 | Japan | 60/39.12 |
| 205340 | 9/1986 | Japan | 60/39.12 |
| 291404 | 12/1987 | Japan | 60/39.12 |

Primary Examiner—Donald E. Stout
Attorney, Agent, or Firm—Balogh, Osann, Kramer, Dvorak, Genova & Traub

[57] ABSTRACT

Disclosed herein is a gas turbine system which is supplied with a low-pressure industrial by-product gas as a fuel and equipped coaxially with a gas compressor for compressing the fuel gas, the system providing a bypass pipeline for returning the gas in a high-pressure gas piping on the discharge side of the fuel gas compressor into a low-pressure gas piping on the inlet side of the compressor through a pressure reducing valve and a cooler, and an emergency gas pressure stabilizer having high responsive characteristics, the stabilizer being provided in the bypass pipeline on the outlet side of the cooler, whereby the high-pressure fuel gas on the discharge side of the fuel gas compressor can be returned safely into a low-pressure industrial by-product gas pipeline.

5 Claims, 5 Drawing Sheets

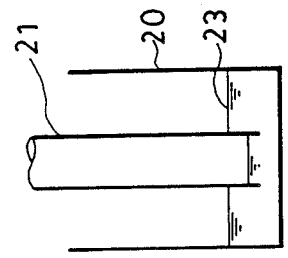
FIG.3 (a) PRIOR ART
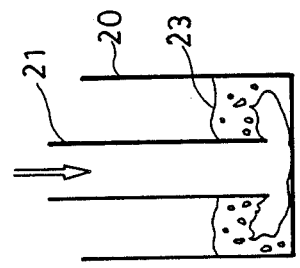
FIG.3 (b) PRIOR ART
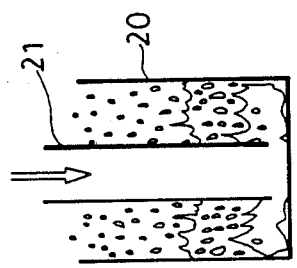
FIG.3 (c) PRIOR ART

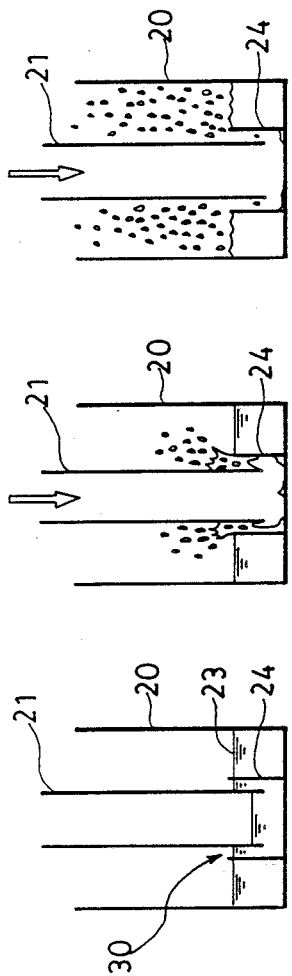

GAS TURBINE PLANT SYSTEM AND GAS PRESSURE STABILIZER THEREOF IN EMERGENCY

BACKGROUND OF THE INVENTION

1. Field of the Invention

This invention relates to a heat recovery gas turbine plant system supplied with a low-pressure industrial by-product gas, for instance, blast furnace gas, as a fuel, and more particularly to a gas pressure stabilizer for safely returning a high pressure fuel gas on the discharge side of a fuel gas compressor into a low-pressure industrial by-product gas pipeline at the time of emergency shut-down of a gas turbine in such a system. Such gas turbine system can be employed in various process plant such as a paper manufacturing and pulp processing plant, a Portland cement manufacturing plant, a petroleum refinery plant or the like where a by product gas is obtained.

2. Description of the Prior Art

As a power generation system employing a by-product gas fired gas turbine supplied with blast furnace gas as a fuel, there has recently been developed a large scale system in which, as disclosed in Japanese Patent Application Laid-Open No. 58-57012 (1983), the blast furnace gas is compressed to be a high-pressure gas, which is mixed with compressed air and burned, and the combustion gas is used to drive a gas turbine, thereby generatint electric power.

In such a power generation system, when an emergency shut down of the gas turbine is required, for example, when a power transmission system is failed and a shut-down interlocking device is operated, it is necessary to cut off the supply of the fuel to the gas turbine, for the shut-down of the gas turbine.

For the purpose of the emergency shut-down of the gas turbine, it is necessary for a gas supply shut-off valve to be located as close as possible to the inlet to the gas turbine. It is also necessary that the shut off operation can be performed at a sufficiently high speed.

The rapid closing action (for instance, in 0.5 to 1 sec) of the gas supply shut-off valve closes the passage on the discharge side of a gas compressor continuously discharging the high-pressure gas, resulting in a rapid increase in the discharge pressure. In practice, therefore, a bypass pressure reducing valve for releasing the high pressure gas into a bypass line must be rapidly opened simultaneously with the rapid closing action of the gas supply shut-off valve so that the passage on the discharge side of the gas compressor is not colsed.

The high-pressure gas on the discharge side of the gas compressor has, for instance, a pressure of about 12 kg/cm$^2$G and a temperature of about 350° C. The pressure of the high pressure gas is lowered by the pressure reducing valve. Then, the gas is further lowered in pressure by a gas cooler disposed on the downstream side of the valve and is, simultaneously, cooled by a water spray, and the resultant low-pressure gas having a pressure of about 0.1 kg/cm$^2$G and a temperature of about 50° C. is returned into the industrial by-product gas pipeline.

The pressure of the gas thus returned is not determined by only the characteristics of the gas compressor, bypass pressure reducing valve and gas cooler, but is further affected by the volume of the industrial by product gas pipeline and the tide of the industrial by-product gas at the moment of the emergency shut-down. Moreover, the pressure of the gas is affected also by the installation position of a gasholder and by the volume absorption rate of the gasholder.

For instance, where the quantity of gas consumed at the ga turbine is greater than the quantity of blast furnace gas generated from the blast furnace, it is difficult to control the pressure at the outlet of the gas cooler to or below a predetermined value at any time, as upon the emergency shut-down of the gas turbine.

Upon the rapid closing action of the gas supply shut-off valve for the emergency shut-down of the gas turbine mentioned above the gas turbine comes to be stopped. The gas compressor, on the other hand, continues rotating due to inertia for a while; therefore, until fully stopped, the compressor continues discharging the gas at a pressure matching the dishcarge resistance. Particularly, at the moment (a few seconds) of the emergency shut-down of the gas turbine, the gas compressor continues discharging the gas at the same rate as immediately before the emergency shut-down.

Therefore, when the bypass pressure reducing valve is rapidly opened in conjunction with the rapid closing of the gas supply shut-off valve for the gas turbine, both the high-pressure gas accumulated in the high pressure gas piping on the discharge side of the compressor and the gas discharged continuously from the compressor are returned into the industrial by-product gas pipeline. In the industrial by-product gas pipeline, therefore, not only the flow of gas toward the gas turbine is shut off but the gas will be caused to flow backward.

This phenomenon makes it more difficult to recognize the condition of pressure setting in the industrial by-product gas system including the gasholder.

For instance, the gas absorption rate limit of the gasholder may be exceeded and the gasholder be broken. Further, sealing water contained in drain discharge seal pots disposed at several positions of the industrial by-product gas pipeline may be blown out, leading to a gas leakage accident.

For effective use of gases, it is practiced to perform calorific value control by appropriately mixing different by-product gases at positions in an industrial by-product gas piping. For instance, blast furnace gas having a lower calorific value is mixed with coke oven gas having a higher calorific value to get a proper calorific value of the mixed gas, thereby matching the calorific value of the gas with the characteristics of the part at which the gas is used. Such a calorific value control through mixing of gases is performed by utilizing a low pressure difference of 500 to 1000 mm Hg, and is therefore heavily influenced by the above-mentioned disturbance in the gas pressure in the industrial by-product gas system.

In view of the above problems it may be contemplated for such a gas turbine plant system to reduce the quantity of the gas returned at a lowered pressure into the low-pressure gas piping upon the closure of the gas supply shut-off valve, by reducing the internal volume of the high-pressure gas piping from the compressor to the gas turbine through shortening the piping or reducing the diameter of the piping. Such an approach, however, involves resrtrictions on layout or increase the flow resistance in the high-pressure gas piping, and is therefore impracticable.

SUMMARY OF THE INVENTION

An object of this invention is to provide a system comprising an emergency gas pressure stabilizer effective for lowering the pressure of a high-pressure gas flowing backward upon emergency shut-down of a large gas turbine supplied with an industrial by-product gas as a fuel.

Another object of the invention is to provide a gas pressure relief device working with tiny differential pressure showing extremely high responsive characteristics when used as an emergency gas pressure stabilizer.

A further object of the invention is to provide a gas pressure relief device on the immediate downstream side of the outlet of a gas cooler, thereby restricting the pressure rise at that position and preventing a pressure disturbance from being propagated to other parts.

A still further object of this invention is to prevent a rapid pressure rise in a gasholder in a low-pressure industrial by-product gas pipeline, blow-out of sealing water from seal pots in the by-product gas pipeline, or the like, thereby ensuring smooth operation of the gas turbine power generation plant and avoiding gas-poisoning due to the gas blown out of the seal pots.

According to this invention, there is provided a gas turbine system which is supplied with a low-pressure industrial by-product gas as a fuel and equipped coaxially with a gas compressor for compressing the fuel gas, the system comprising a bypass pipeline for returning the gas in a high-pressure gas piping on the discharge side of the fuel gas compressor into a low-pressure gas piping on the inlet side of the compressor through a pressure reducing valve and a cooler, and an emergency gas pressure stabilizer having high responsive characteristics, the stabilizer being provided in the bypass pipeline on the outlet side of the cooler.

BRIEF DESCRIPTION OF THE DRAWINGS

FIG. 3 is an illustration of the operation of a prior art water seal device;

FIG. 4 is an illustration of the operation of the emergency gas pressure stabilizer according to this invention.

DESCRIPTION OF PREFERRED EMBODIMENTS

Figure 5:
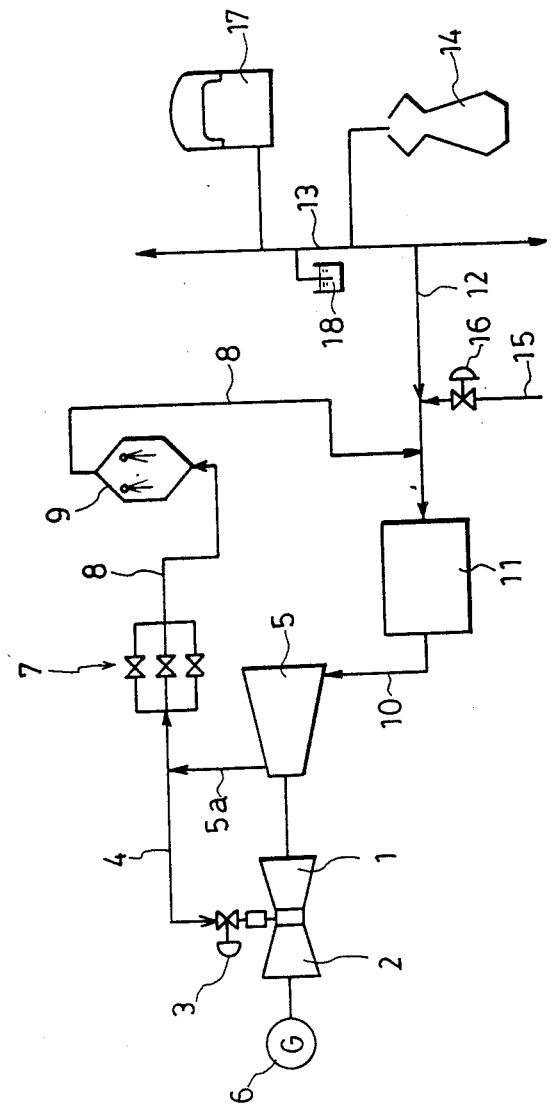
FIG. 5 is a flow sheet showing an exemplary construction of a prior art gas turbine plant system.

FIG. 5 shows an example of a gas turbine system in which blast furnace gas is used as a fuel. The gas generated from a blast furnace 14 is drawn out of a blast furnace gas main pipe 13 by a blast furnace gas inducting pipe 12. On the other hand, a coke oven gas supplied through a piping 15 is fed into the blast furnace gas inducting pipe 12 through a control valve 16, to form a mixed gas having a predetermined calorific value, for example, about 1000 Kcal/Nm$^3$. The mixed gas is passed through a dust catcher 11, a piping 10 and a gas compressor 5, whereby the mixed gas is raised in pressure to about 12 kg/cm$^2$ to be a high-pressure gas. The high-pressure gas is mixed with compressed air supplied through an air compressor 2, and is burned, and the resultant combustion gas is supplied to a gas turbine 1. The gas turbine 1 drives a generator 6, which generates electric power.

In such a power generation system, when a power transmission system (not shown), for example, is failed, a gas supply shut off valve 3 for the gas turbine 1 is closed instantaneouly (for example, in 0.5 to 1 sec). Simultaneously, the high-pressure gas is reduced in pressure from 12 kg/cm$^2$ to 0.1 kg/cm$^2$ by a pressure reducing valve 7, and the low-pressure gas is returned into a low-pressure gas piping 8. The gas thus lowered in pressure is led through the gas piping 8 into a gas cooler 9, where the gas is cooled from about 300° C. to about 50° C., and the cooled gas is returned into the blast furnace gas inducting pipe 12.

Normally, a high-pressure gas supply pipe 5a supplies the high-pressure gas from the gas compressor 5 to the gas turbine 1. But, when the gas supply shut-off valve 3 is instantaneously closed due to, for instance, the above-mentioned failure in the power transmission system, the entire quantity of the high-pressure gas having been supplied to the gas turbine 1 is returned through the low-pressure gas piping 8 into the blast furnace gas inducting pipe 12. Besides, in a low-load operation in whcih the gas turbine 1 is operated with a gas quantity below the proper operation range of the gas compressor 5, a portion of the high-pressure gas is decompressed and bypassed into the blast furnace gas inducting pipe 12 in order to prevent a surging phenomenon of the gas compressor 5.

Figure 1:
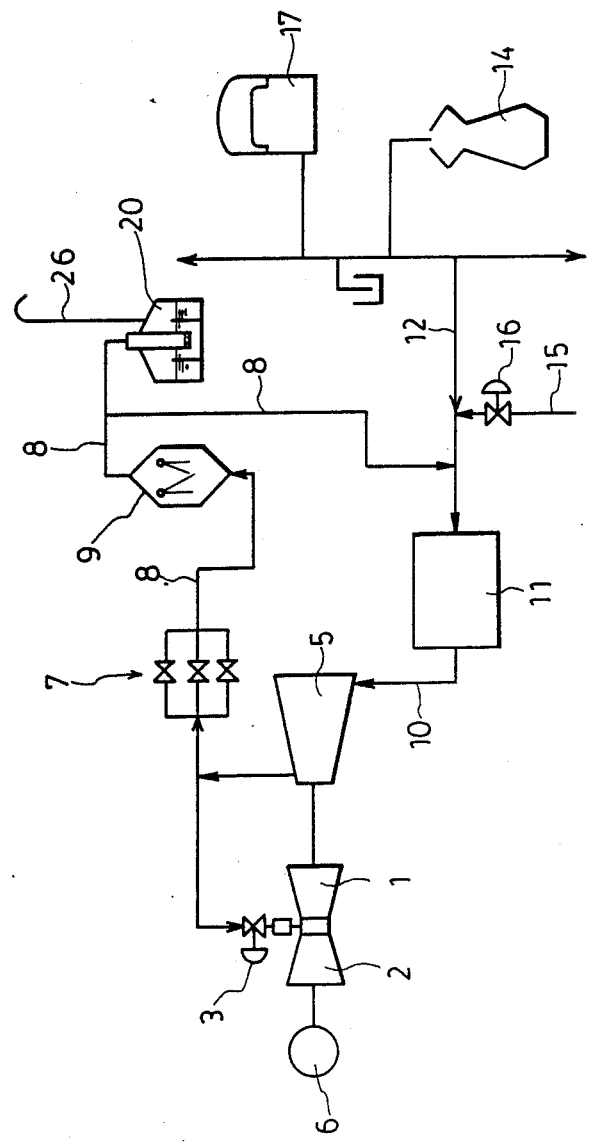
FIG. 1 is a flow sheet of a gas turbine plant system according t this invention.

The present inventors have made intensive studies of the system shown in FIG. 1, before attaining this invention. As a result of the studies, it has been found that when a water seal device 20 is provided on the outlet side of the cooler 9, the high-pressure gas at a pressure of about 12 kg/cm$^2$ blowing backward upon the instantaneous closure of the gas supply shut-off valve 3 is decompressed to 5 kg/cm$^2$ by the pressure reducing valve 7, is then decompressed to 800 mm H$_2$O by the cooler 9 and further pressure relief is performed by the water seal device 20, whereby it is possible to lower the pressure in the bypass piping up to about 500 mm H$_2$O.

If the water seal device 20 comprises a sealing water pipe 21 simply water sealed, as shown in FIG. 3(a), the construction being conventionally known in the gas suppliers, the instantaneous rise in the gas pressure results in a rising of the water surface 23, as shown in FIG. 3(b). When the gas subsequently breaks the water sealing function, the pressure loss is so large (FIG. 3(c)) that the gas cannot flow through and, therefore, the relief of the gas pressure is not achieved. Thus, the gas pressure of 800 mm H$_2$O at the outlet of the cooler 9 at the time of emergency shut-down of the gas turbine cannot be lowered to a pressure not exerting a great effect on the low-pressure gas piping 8, the blast furnace gas inducting pipe 12 or the low-pressure gas piping 13, namely, to a pressure of about 500 mm H$_2$O, which is higher than the pressure in low-pressure gas system by 150 to 200 mm H$_2$O.

In view of the above, it may be contemplated to lower the height of the water surface 23 in the water seal device 20. This approach, however, may lead to breakage of the water seal even under gas pressure variations during normal operation, resulting in gas leakage. Therefore, it is the usual practice to secure a predetermined water level, and it is impossible to lower the water level.

Figure 2:
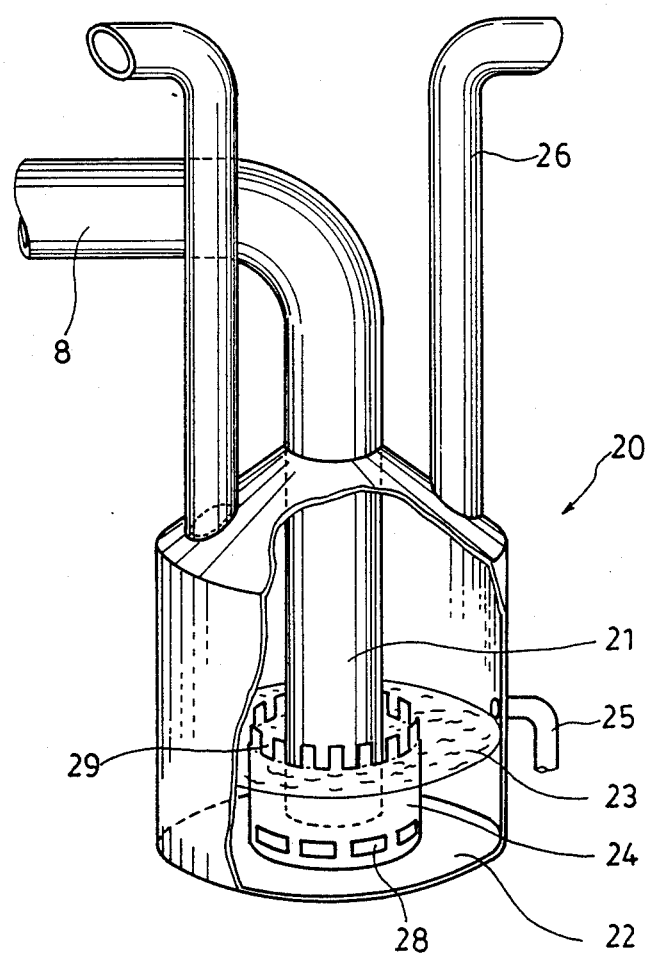
FIG. 2 is a partially cutaway perspective view of a major portion of an embodiment of an emergency gas pressure stabilizer of this invention.

In consideration of the above, the present inventors made experiments with a double tube construction provided at a tip portion of a sealing water pipe 21, as shown in FIG. 2. In the double tube construction, the sealing water pipe 21 constitutes an inner cylinder, and an outer cylinder 24 is constituted of an externally disposed pipe which is provided with a multiplicity of notch grooves 29 located at the boundary of the water surface along the circumferential direction and is provided near bottom portion thereof with a multiplicity of lost portions, for instance, slit holes 28 for communication between the interior and the exterior of the external pipe. As a result of the experiments, it has been found out that it is possible to instantaneously lower the gas pressure at the outlet of the cooler to 500 mm $H_2O$. This is due to a phenomenon in which, as shown FIG. 4(a), a gap 30 defined by the sealing water pipe 21 and the outer cylinder 24 acts to cause water to be instantaneously blown out of the gap 30 as shown in FIG. 4(b), whereby the water seal is broken and a passage being devoid of water is securely formed, so that the gas pressure is instantly released, as shown in FIG. 4(c).

In FIG. 2, an overflow pipe 25 is provided for controlling the water level in the water seal device, and a gas relief pipe 26 is provided for discharging the gas to a high position in the air upon the breakage of the water seal.

The outer cylinder 24 is provided, near a bottom portion 22 of the water seal device, with the lost portions (slit holes for communication between the interior and the exterior of the outer cylinder) 28 which permit the sealing water to pass therethrough. The designated numerals in FIG. 1 are the same as those in FIG. 5.

The upper end notch grooves 29 and the slit holes 28 shown in FIG. 2 are provided for restoring the water seal broken. The moment the gas pressure is released, the surrounding water is permitted to flow in through the upper end notch grooves 29 and the slit holes 28 to form a water seal again.

The upper end notch grooves 29 are provided for the following reason.

For a higher response to the instantaneous rise in the gas pressure, it is necessary for the small amount of sealing water sealing the outer cylinder to be blown out. In addition, for restoration of the water seal upon the return of the pressure to a normal level it is necessary for the water thus blown out to be returned into the interior of the outer cylinder. The upper end notch grooves are provided for effective realization of the function to enhance the response.

The function of the slit holes 28 provided at a lower portion of the outer cylinder is as follows.

By observation of the behavior of sealing water and the gas in the experiments (FIG. 3), it has been revealed that the reponsive characteristics is further raisable by providing slit holes in a lower portion of the outer cylinder. Of the intended functions to prevent the instantaneous rise in the gas pressure and to restore the water seal under normal pressure, the function to restore the water seal is not satisfactorily ensured by providing the outer cylinder and providing the notch grooves at the upper end of the outer cylinder. Namely, once the gas pressure is raised, the water seal cannot be restored easily, and the gas is left blowing out. In consideration of this, the slit holes are provided in a lower portion of the outer cylinder so that the water pressure on the outer cylinder is exerted on the inner cylinder and the water seal is easily restorable.

According to the above considerations, when the water seal device 20 is provided on the downstream side of the cooler 9 as shown in FIG. 1, the gas discharged from the cooler 9 at 800 mm $H_2O$ breaks instantaneously the water seal with a pressure fall, for instance, to 500 mm $H_2O$, and a portion of the gas is released into the atmosphere through the diffuser pipe 26, while the major portion of the gas is returnable through the bypass piping 8 into the blast furnace gas inducting pipe 12, namely, the low-pressure gas piping on the inlet side of the gas compressor 11.

Since the gas pressure has been lowered to about 500 mm $H_2O$, in this case, it is possible to prevent the breakage of the gasholder 17 due to a rapid pressure increase in the gasholder and to prevent the gas leakage accident due to blow-out of sealing water from the seal pots.

The gas pressure of 500 mm $H_2O$, mentioned by way of example in the above explanation, is not limitative. It is possible to select an appropriate value of the gas pressure by modifying the initial setting of the sealing water pressure through modification of the position of the overflow pipe 25 according to the actual situation of the plant to which the present system is applied.

This invention will now be explained more in detail while referring to a particular example.

The emergency gas pressure stabilizer shown in FIG. 2 was fitted to a gas turbine power generation equipment shown in FIG. 1, in which blast furnace gas and coke oven gas were mixed to have a calorific value of 1000 Kcal/$Nm^3$, the mixed gas was compressed to a pressure of 12 kg/$cm^2$ to produce a mixed gas at a rate of 250,000 $Nm^3$/H, and the thus obtained gas was supplied to a 140 MW class gas turbine 1.

In an operation with a gas turbine load of 140 MWH (100%), an actual emergency shut-down test was carried out on the gas turbine. When the gas supply shut-off valve 3 shown in FIG. 1 was closed, the gas pressure of 800 mm $H_2O$ on the outlet side of the cooler 9 was instantaneously lowered to 500 mm $H_2O$, and it was possible to return the high-pressure gas into the blast furnace gas inducting pipe 12 and the blast furnace gas main pipe 13 smoothly, without causing a rapid pressure rise in the gasholder or blow-out of sealing water from the seal pots.

The emergency gas pressure stabilizer according to this invention utilizes the properties of water and does not comprise mechanically moving component parts such as valves; therefore, the emergency gas pressure stabilizer operates securely, with only the water level control by overflow, and is extremely high in reliability.

What is claimed is:

1. A gas turbine system which is supplied with a low-pressure industrial by-product gas as a fuel and equipped coaxially with a gas compressor for compressing the fuel gas, the system comprising a bypass pipeline for returning the gas in a high-pressure gas piping on the discharge side of the fuel gas compressor into a low-pressure gas piping on the inlet side of the compressor through a pressure reducing valve and a cooler, and an emergency gas pressure stabilizer having high responsive characteristics, the stabilizer being provided in the bypass pipeline on the outlet side of the cooler.

2. A heat recovery system from an industrial by-product gas which comprises a combustion turbine, a gas compressor coupled to the combustion turbine, an industrial by-product gas inlet pipe connected to the gas compressor, a connecting pipe between the discharge side of the gas compressor and a gas supply shut-off valve of the combustion turbine, a pressure reducing valve branched from the connecting pipe, a low pressure gas pipe connected between the pressure reducing valve and the industrial by-product gas inlet pipe and a cooler provided in the low pressure gas pipe characterized in that an emergency gas pressure stabilizer is interposed in the low pressure gas pipe on the outlet side of the cooler.

3. An emergency gas pressure stabilizer for a gas turbine system supplied with a low-pressure industrial by-product gas as a fuel and equipped coaxially with a gas compressor for compressing the fuel gas, the stabilizer being constituted of a water seal device, the water seal device comprising a sealing water pipe, and an outer cylinder disposed at the water seal end of the sealing water pipe in a double tube form, the outer cylinder having such a height as to extend from a bottom portion of the water seal device to above the water level in the water seal device and being greater than the sealing water pipe in diameter, the outer cylinder being provided near a bottom portion thereof with slit holes for permitting communication between the interior and the exterior of the outer cylinder, the outer cylinder also being provided with a multiplicity of notch grooves at an upper edge thereof.

4. An emergency gas pressure stabilizer for a gas turbine system supplied with a low-pressure industrial by-product gas as a fuel and equipped coaxially with a gas compressor for compressing the fuel gas, the stabilizer being constituted of a water seal device, the water seal device comprising a sealing water pipe, and an outer cylinder disposed at the water seal end of the sealing water pipe in a double tube form, the outer cylinder having such a height as to extend from a bottom portion of the water seal device to above the water level in the water seal device, being greater than the sealing water pipe in diameter, and being provided with a multiplicity of notch grooves at an upper edge thereof.

5. The emergency gas pressure stabilizer as set forth in claim 4, wherein the outer cylinder is provided near a bottom portion thereof with slit holes for permitting communication between the interior and the exterior of the outer cylinder.

* * * * *